United States Patent [19]

Brown et al.

[11] 4,323,756

[45] Apr. 6, 1982

[54] METHOD FOR FABRICATING ARTICLES BY SEQUENTIAL LAYER DEPOSITION

[75] Inventors: Clyde O. Brown, Newington; Edward M. Breinan, Glastonbury; Bernard H. Kear, Madison, all of Conn.

[73] Assignee: United Technologies Corporation, Hartford, Conn.

[21] Appl. No.: 88,808

[22] Filed: Oct. 29, 1979

[51] Int. Cl.³ .............................................. B23K 27/00
[52] U.S. Cl. ........................ 219/121 LF; 219/121 LM
[58] Field of Search ................. 219/121 LE, 121 LF, 219/121 LW, 121 LY, 121 L, 121 LM, 121 EF, 121 EG, 121 EC, 121 ED, 121 EU, 121 EV, 121 EX; 148/4, 39, 126; 75/65 EB; 427/53.1

[56] References Cited

U.S. PATENT DOCUMENTS

| | | | |
|---|---|---|---|
| 2,841,687 | 7/1958 | Richter | 219/76.15 |
| 3,405,247 | 10/1968 | Hlivka | 219/76.15 |
| 3,952,180 | 4/1976 | Gnanamuthu | 219/121 LE |
| 3,985,995 | 10/1976 | Brandi et al. | 219/76 |
| 4,019,011 | 4/1977 | Cape | 219/76 |
| 4,117,302 | 9/1978 | Earle et al. | 219/121 LC X |
| 4,125,926 | 11/1978 | Gale et al. | 219/121 LC X |
| 4,270,675 | 6/1981 | Wicks et al. | 222/196 |

FOREIGN PATENT DOCUMENTS 2134662 1/1973 Fed. Rep. of Germany .......... 148/4

Primary Examiner—C. L. Albritton
Attorney, Agent, or Firm—Charles E. Sohl

[57] ABSTRACT

A method is described for the production of bulk rapidly solidified metallic articles of near-net shape, by depositing multiple thin layers of feedstock using an energy beam to fuse each layer onto a substrate. The feedstock may be in the form of metal powder or wire. Different finished geometries are also described.

11 Claims, 7 Drawing Figures

METHOD FOR FABRICATING ARTICLES BY SEQUENTIAL LAYER DEPOSITION

BACKGROUND OF THE INVENTION

The Government has rights in claims pursuant to Contract No. N00014-77-C-0418 awarded by the Department of the Navy.

FIELD OF THE INVENTION

This invention relates to the production of bulk rapidly solidified articles from metallic feedstock using an energy beam as a heat source to fuse the feedstock onto a substrate. Repeated layers are deposited to arrive at the finished product.

DESCRIPTION OF THE PRIOR ART

It has been known in the prior art to use various welding techniques to provide hardened surfaces on metallic objects. It has also been known to use electric welding techniques in the build up of large metallic objects. This is shown, for example, in U.S. Pat. No. 3,985,995 in which an electric arc welding process is used to fabricate a large diameter metal shaft by the build up of weld deposited material. Insofar as we can determine this type of process employs low energy densities and does not involve substantial substrate melting, or any attempt to control solidification rate. This can be seen by consideration of FIG. 3 of the patent. A similar teaching is shown in U.S Pat. No. 3,665,143 in which composite tubing is built-up by use of a plurality of electrical arc welding devices.

It has also been known in the prior art to use lasers and electron beams as a heating source for welding and other metal working operations. This is shown, for example, in U.S. Pat. No. 4,059,876 which shows the use of a laser in the fabrication of alloy valve seats for automobile engines. U.S. Pat. No. 4,122,240 teaches that rapid shallow surface melting can be used to produce ultra high solidification rates. In this patent, lasers are used as the surface melting energy source.

Another use of lasers is shown in U.S. Pat. No. 3,310,423 in which a pulsed laser is used to fuse deposits, previously applied by plasma spraying, into a substrate.

U.S. Pat. No. 3,819,901 shows a method for applying a powdered hardfacing material to a substrate using a plasma jet as a source of heat. T967,009 shows a powder feed system in combination with a laser apparatus for hardfacing.

SUMMARY OF THE INVENTION

This invention is a method for producing bulk articles by the sequential deposition of thin layers of melted feedstock. The energy source employed may be a laser or an electron beam.

By use of a high energy density, high cooling rates may be achieved, and the resultant microstructure will be very homogeneous.

The feedstock employed in the practice of the invention may be either a wire or powder material, and this feedstock is applied to the substrate in such a fashion that it passes through the laser beam and fuses to the melted portion of the substrate.

This invention has particular utility in the fabrication of certain gas turbine engine components including discs and knife-edge air seals.

The foregoing and other objects, features and advantages of the present invention will become more apparent in light of the following detailed description of the preferred embodiments thereof as discussed and illustrated in the accompanying drawings.

DESCRIPTION OF THE PREFERRED EMBODIMENT

The present invention concerns the build up of metallic parts by the repetitive deposition of thin uniform layers of molten metal which solidify rapidly as a consequence of efficient heat conduction into the substrate.

Figure 1:
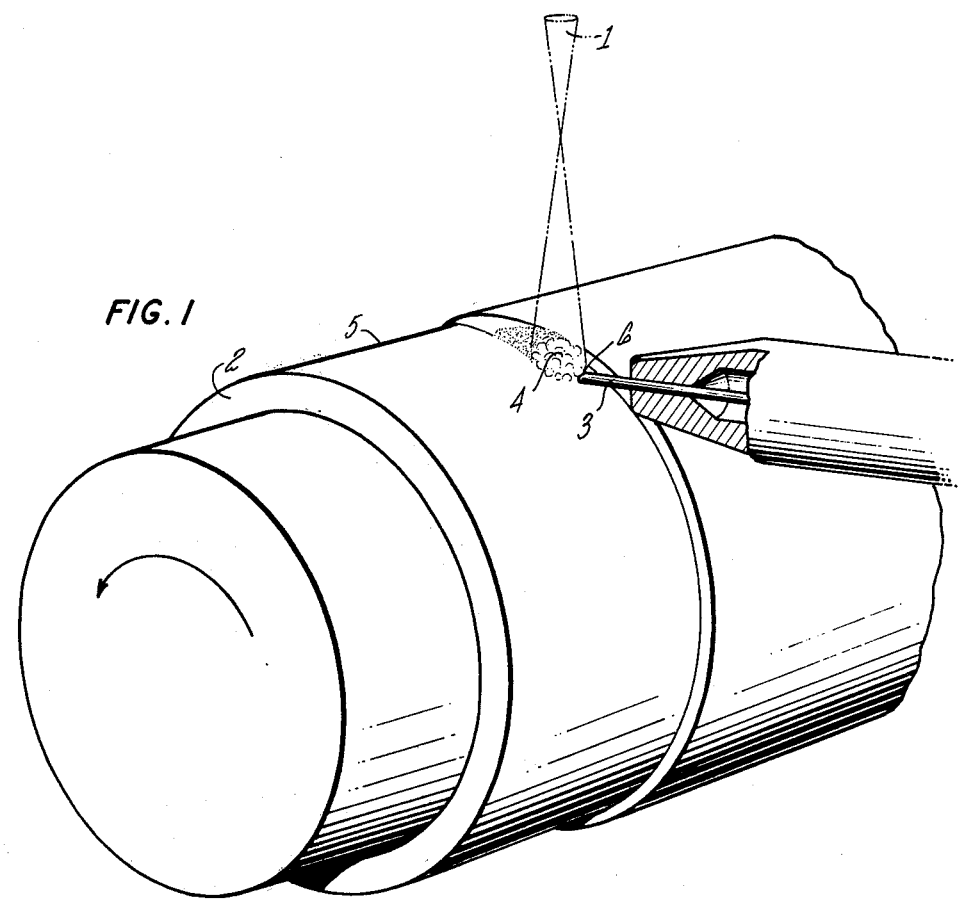
FIG. 1 shows the general relationship between the substrate, the energy beam and feedstock.

This process has several distinct embodiments relating to different build up configurations and different material feed methods. However, all of these embodiments share certain common features which will be described with reference to FIG. 1. While FIG. 1 shows a moving substrate and fixed energy beam and material feed point, obviously all that is required is relative motion. Thus, a fixed substrate and moving energy beam and material feed point could also be used.

FIG. 1 shows the relationship between the energy beam 1, the workpiece or substrate 2, and the material being deposited 3. As shown in FIG. 1, the invention employs a concentrated direct energy source 1, focused so that the energy density at the point 4 where the beam intersects the substrate surface 5 is on the order of $10^5$ w/cm$^2$. This energy must be transformed into heat at or very near the surface.

We are aware of only two energy sources which can supply these required high energy densities, lasers and electron beams. All of our experimental work to date has been performed with a continuous carbon-dioxide laser, but other related work leads us to believe that electron beam sources will produce results equal in every respect to those produced with the laser. Other types of continuous lasers will also be satisfactory assuming that they can provide sufficient power. Some form of atmosphere control will generally be necessary. For a laser energy source, this can be either an appropriate inert gas or a vacuum. A relatively high vacuum is required if an electron beam is to be used as the energy source.

As shown in FIG. 1, the workpiece surface 5 moves relative to the energy beam 1, and the rate of motion is adjusted so that the absorbed energy is on the order of 10–100 J/sq. cm/sec. The absorbed energy is sufficient to melt the substrate to a shallow depth. Additional material fed into the beam is also melted and deposited onto the previously melted workpiece within the region 4 of the interaction between the beam and the substrate.

A critical feature of this invention is the relationship of the material feed point 6 to the point of interaction 4 between the energy beam 1 and the workpiece surface 5. This is shown most clearly in FIG. 2.

Figure 2:
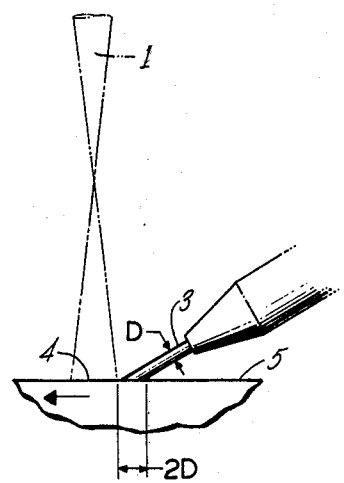
FIG. 2 is a cross-sectional view in a more exact fashion of the relationship between the energy beam and feedstock.

As illustrated in FIG. 2, it is desirable that the feedstock 3 contact the workpiece surface 5 outside of the energy beam 1, but very near the point 4 where the laser beam 1 intersects the workpiece surface 5. The point of contact should be within 2D of the laser beam edge where "D" is the thickness of the feedstock stream. Preferably, the center of mass of the feedstock material should strike the substrate as close to the center line of the laser beam as possible so that it is carried through the energy beam on a major diameter. As described below a different geometry is employed in the case of wire feed build up of a fin.

In FIG. 1, the feedstock is shown as being a wire which is fed through a guide nozzle. This type of feed mechanism is commercially available in the form of various types of apparatus which are designed to feed wires in conventional arc welding processes.

As shown in FIG. 2, the material feedstock 3 touches the workpiece surface 5 upstream of the point of contact 4 between the energy beam 1 and the workpiece surface 5, and the feed material 3 is brought into the interaction zone of the energy beam and the molten pool of metal and is melted into the molten pool.

If a wire feedstock enters the laser beam before it contacts the workpiece surface, it will melt and form globules, suspended from the wire, which will either fall off the feedstock and drop onto the surface or will grow on the end of the feedstock until the globules touch the workpiece surface. Either of these conditions is unsatisfactory and produces a rough, irregular deposit. When the feedstock touches the workpiece surface at a distance much beyond the feedstock diameter, upstream of the edge of the laser beam, feed material transport becomes erratic and in the extreme case cannot be controlled adequately to bring the feed material to the energy source in a satisfactory manner. If the feedstock is axially displaced from the laser beam outside of the target zone, incomplete feedstock melting will result.

Figure 3:
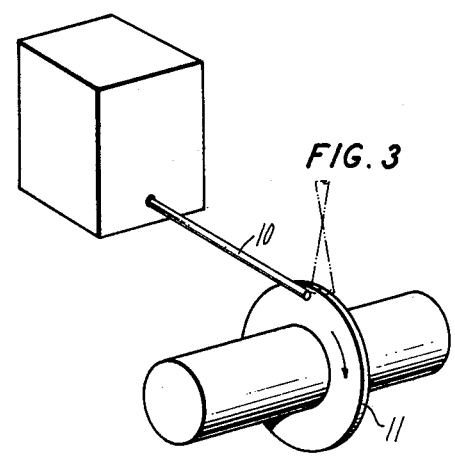
FIG. 3 shows a particular preferred feed relationship for the production of thin fins using wire feed.

FIG. 3 illustrates an acceptable embodiment where a wire feedstock 10 is to be used to build up a thin fin 11, where the wire diameter is about the same size as the fin thickness. In this situation, it has been found possible to project the wire 11 parallel to the fin 10, but off to the side. With this arrangement, the melted feedstock is drawn to the top of the fin by surface tension. This arrangement avoids problems with wire alignment. While one can align the wire on the top of the fin, it is quite difficult to keep it properly aligned. The side-feed method is for the wire feed build up of fins. It has no application to the use of a powder feedstock, or to the build up of a thick disc using a wire feed.

There are certain limitations associated with wire feed. These include the difficulty and expense in obtaining thin wires of certain alloys. The diameter of the feedstock which we have employed to date ranges from 15 to 50 mils, and it is difficult if not impossible to process many alloys into a wire in this size range.

An alternative method, which is often more satisfactory, is the use of powder feedstock. The powder is supplied through a fine nozzle and there is general equivalence between wire size and powder stream diameter (as defined by nozzle diameter) for a given set of operating conditions. For the successful use of powder feed, careful attention must be paid to the delivery of a constant mass flow of powder which is collimated into a uniform stream. A variety of specialized experimental devices have been developed for this purpose, and one of these will be described in the examples below.

The advantages of powder include the fact that fine powders are readily available or can be produced of almost any conceivable alloy composition. Most importantly, it has been observed that the energy beam couples to powder much more effectively than it couples to wire. By "couple" we mean the relative efficiency of energy absorption. Since the laser in question is an optical device emitting infrared radiation, there is a pronounced tendency for reflection to occur from a smooth metal surface such as exists on wires. However, an aggregation of fine powder particles effectively contains many small cavities which trap and absorb the infrared radiation by multiple reflections, thus increasing the powder absorption.

A further benefit observed from the use of powder is that it is to a certain extent self-regulating. If a wire is used whose diameter is too large for the operating conditions incomplete melting will occur, and the unmelted portion of the wire will project from the surface of the workpiece. This constitutes an unacceptable process defect.

In the case of powder, however, the improved absorptivity gives substantially greater tolerance to variations in mass flow rate. An additional advantage of powder feed is the ability to change or continuously vary the feedstock composition during the build up process. This allows the structure and properties of the bulk solid being produced to be varied as desired by the fabricator.

A novel feature of this invention is that a large number of thin layers of materials are melted on the surface of the workpiece in a sequential controlled fashion to form a relatively massive rapidly solidified structure. This invention envisions the use of hundreds if not thousands of such thin layers. In the prior art, it has been known to use heat sources of much lower intensity, (e.g. in welding equipment) to fuse or partially fuse material into the surface of a workpiece. However, so far as it is known, no one in the prior art used a heat source having the energy density contemplated by the present invention.

Use of a clean, extremely high energy density source permits the achievement of goals which are not achievable by prior art, specifically, the advantages of structural integrity, combined with microstructural control and modification as accomplished by rapid solidification techniques described in U.S. Pat. No. 4,122,240. These goals require the use of an inert gas or a vacuum atmosphere to minimize contamination.

The prior art processes used relatively low power densities for melting. As a result, there was no pronounced melting of the substrate in the prior art, rather it was a case of melting the feedstock and applying it to the basically solid substrate. Of course, some minor melting of the very outer surface of the substrate may well have occurred, but the depth of substrate surface melting was always, to the best of our knowledge, substantially less than the thickness of material applied per pass.

In the present invention, the substantially higher power density employed causes significant melting of the substrate surface. It has been observed that the substrate melts to a depth greater than the thickness of the applied feedstock layer. As a result, each portion of the applied material is melted more than once, once upon original application and then again as that portion becomes a part of the substrate and more feedstock material is overlaid.

This multiple melting permits some material purification since some impurities may be vaporized; and most significantly, ensures the production of a pore free structure. It also provides perfect metallurgical bonding between deposited layers and promotes continuity of grain structure; i.e., epitaxial growth from one layer to the next. We believe that the multiple melting is essential to the successful use of powder as a feed material.

The present invention relates most conveniently to structures of axial symmetry, although, as will be pointed out below, it can be extended to nonaxially symmetric articles.

Figure 4:
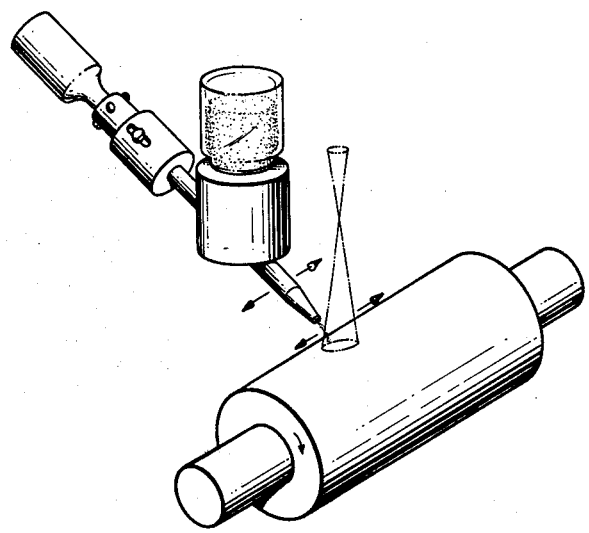
FIG. 4 shows a general preferred feed relationship for the build up of a massive article.

We have classified the structures produced by this invention as being either two-dimensional or three-dimensional. FIG. 3 shows a two-dimensional structure, while FIG. 4 shows a three-dimensional structure. Obviously, the structure in FIG. 3 has three-dimensions, however, the third dimension, the thickness of the fin, is quite small relative to the other two dimensions. By way of example, we have produced fins on a cylindrical workpiece with a diameter of 6 inches with the fins having a width of less than 0.02 inches and a height above the workpiece of 1 inch. Such fins are produced by the rotation of the workpiece beneath the laser beam and feedstock without any axial translation of the workpiece.

This particular embodiment of thin fins has particular utility in the field of gas turbine engines. In such engines, so called knife-edge seals are frequently used to minimize gas leakage between rotating and stationary components. Most often such seals are used on rotating shafts. Such seals consist of a raised thin fin perhaps 0.012 inches thick and 0.3 inches high. Current practice is to produce such fins by machining the component from a much larger starting blank leaving only the desired fin, a tedious and expensive procedure.

A consequence of this procedure is that the fin is of necessity of the same composition as the shaft. While the material is more than adequate for the requirement imposed on the shaft it is not optimized for the knife-edge seal application. In particular, the seal requires high hardness and abrasion resistance, combined with oxidation resistance, to a greater degree than the bulk shaft material.

Thus, the field of gas turbine knife-edge seal fabrication and repair appears ideally suited to the present invention. The deposited fin may have a composition substantially different from the shaft. The seal composition and properties may also be varied as a function of the radial seal dimension. After fin build up by the present invention process, only very minor finish machining is necessary to produce the desired final configuration.

The bulk structure shown in FIG. 4, termed 3 dimensional, is produced by axial translation of a cylindrical piece relative to the laser beam and feedstock in combination with relative rotation of the workpiece.

The disc embodiment shown in FIG. 4 also has application in the gas turbine field. Gas turbines contain numerous discs on which are mounted the blades which harness the power of the turbine. Such discs operate at high rpm in a hostile environment and their weight must be minimized. Current fabrication techniques employ massive forgings which are substantially machined to final form. The volume of metal removed greatly exceeds the volume of metal in the final disc. This is obviously an inefficient and expensive process. The present invention holds great promise for efficient fabrication of high performance gas turbine disc components.

An added advantage of the present process in the fabrication of bulk articles is the possibility of continuous in situ inspection. Currently great pains are taken to ensure that no flaws exist in gas turbine discs. Despite all these precautions, the complete absence of flaws can never be absolutely known. The present invention process builds up a bulk part by the sequential deposition of numerous thin layers. The layer thickness is never greater than about 0.005 inches. Thus, the process lends itself to continuous inspection processes which might well be automated. Upon the detection of a flaw, the process can be stopped and the flaw remedied without the necessity of discarding the entire disc.

Figure 5:
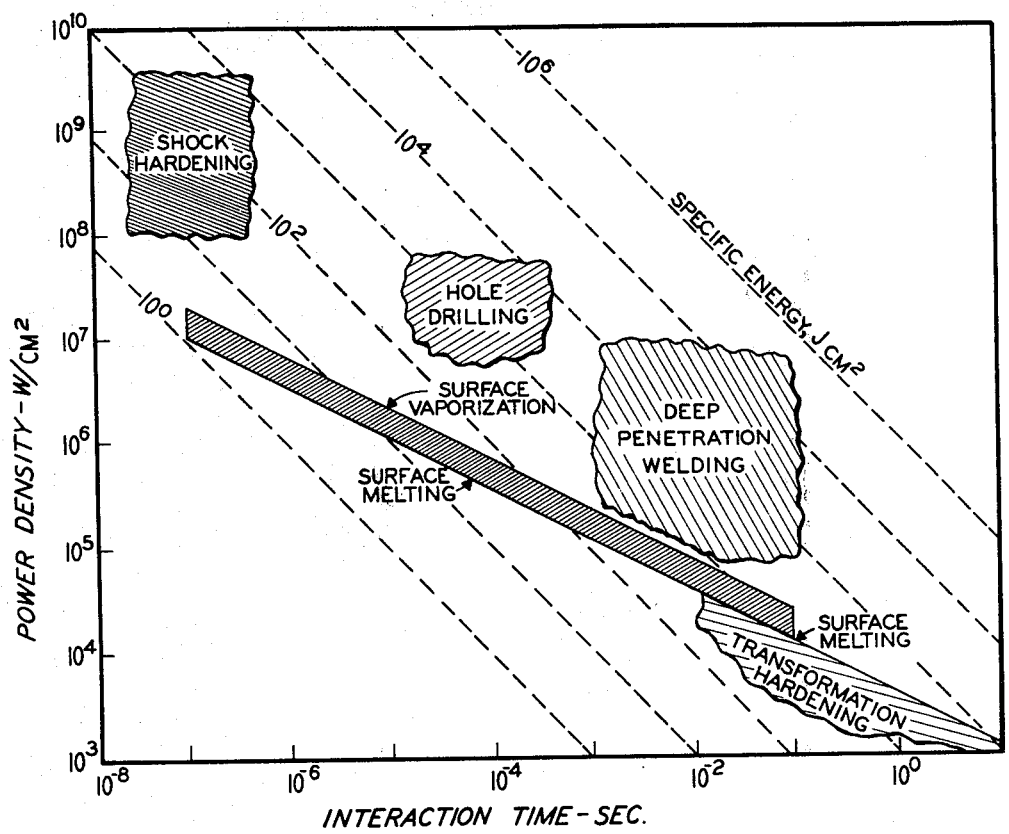
FIG. 5 shows the relationship between power density and time for the invention process and FIG. 6 shows a powder feed apparatus.

The process details of the present invention may be better understood with reference to FIG. 5 which shows the melting behavior of nickel under the influence of different combinations of applied power densities and interaction times. This figure is very similar to FIG. 1 of U.S. Pat. No. 4,122,240, Oct. 24, 1978. This patent is incorporated herein by reference.

The sloping crosshatched band represents the area of interest in this invention. This was also the area of interest in U.S. Pat. No. 4,122,240. FIG. 5 also shows the approximate conditions which have been employed in various prior art laser processes. In the present invention, the substrate surface is rapidly though shallowly melted, preferably without significant surface vaporization. A controlled amount of (melted) feedstock material is added to the previously melted substrate before solidification. The top boundary of this band represents locus of those conditions under which surface vaporization first occurs. While limited surface vaporization is not fatal to the process, it is preferred that the surface vaporization largely be avoided. The bottom boundary of this band is the locus under those conditions for which surface melting occurs. Since this process depends upon substrate melting as well as feedstock melting, the process conditions must be performed under conditions which ensure surface melting.

Thus, for all practical purposes, the band shown in FIG. 5 encompasses the useful operating conditions for the practice of the present invention. We emphasize that this diagram has been calculated rather than experimentally determined, however, all our experiments verify these calculations. Further, we note that the calculated band is based on the properties of pure nickel. Utilization of materials other than nickel will obviously shift the band. Our experience, however, has been that such shifts are slight for most engineering materials of practical interest.

As previously indicated, an important feature of this process is that substantial substrate melting occurs. There are prior art processes in which materials are fused to substrates, but in most of these processes there is no appreciable substrate melting, only the material being applied is melted.

In the present invention, the volume of substrate which melts is greater than the volume of the applied layer. This means that in the invention process each portion of applied material is melted two or more times. The applied material is melted when it is applied and is subsequently melted as more material is applied to the substrate surface.

As a consequence of the thermal conditions employed in the practice of this invention, conditions are favorable for epitaxial growth. "Epitaxial growth" means that the underlying crystal structure of the under melt substrate is propagated as the melt material solidifies. The epitaxial growth is largely a result of the essentially unidirectional heat flow. During solidification the heat flows radially into the substrate and this encourages directional crystal growth in the radial direction.

EXAMPLES

The following examples illustrate the application of the present invention in a variety of different embodiments. In all of the examples listed below, a continuous convectively cooled $CO_2$ laser was employed of the unstable resonator type, having a wavelength of 10.6 microns and a power output of up to 10 kw. This power output was focused by an optical system and concentrated into a spot of 3.2 mm in diameter so that the resultant power density was about 6.3 times $10^4$ w/sq. cm at 5 kw applied power.

EXAMPLE 1

An experimental alloy containing 3.36% aluminum, 17.9% molybdenum, 8.44% tantalum, balance nickel, was procured in the form of −170+500 mesh powder.

This powder was fed through a nozzle onto the surface of the rotating workpiece at a rate of about 0.1–0.15 gm/sec.

Figure 6:
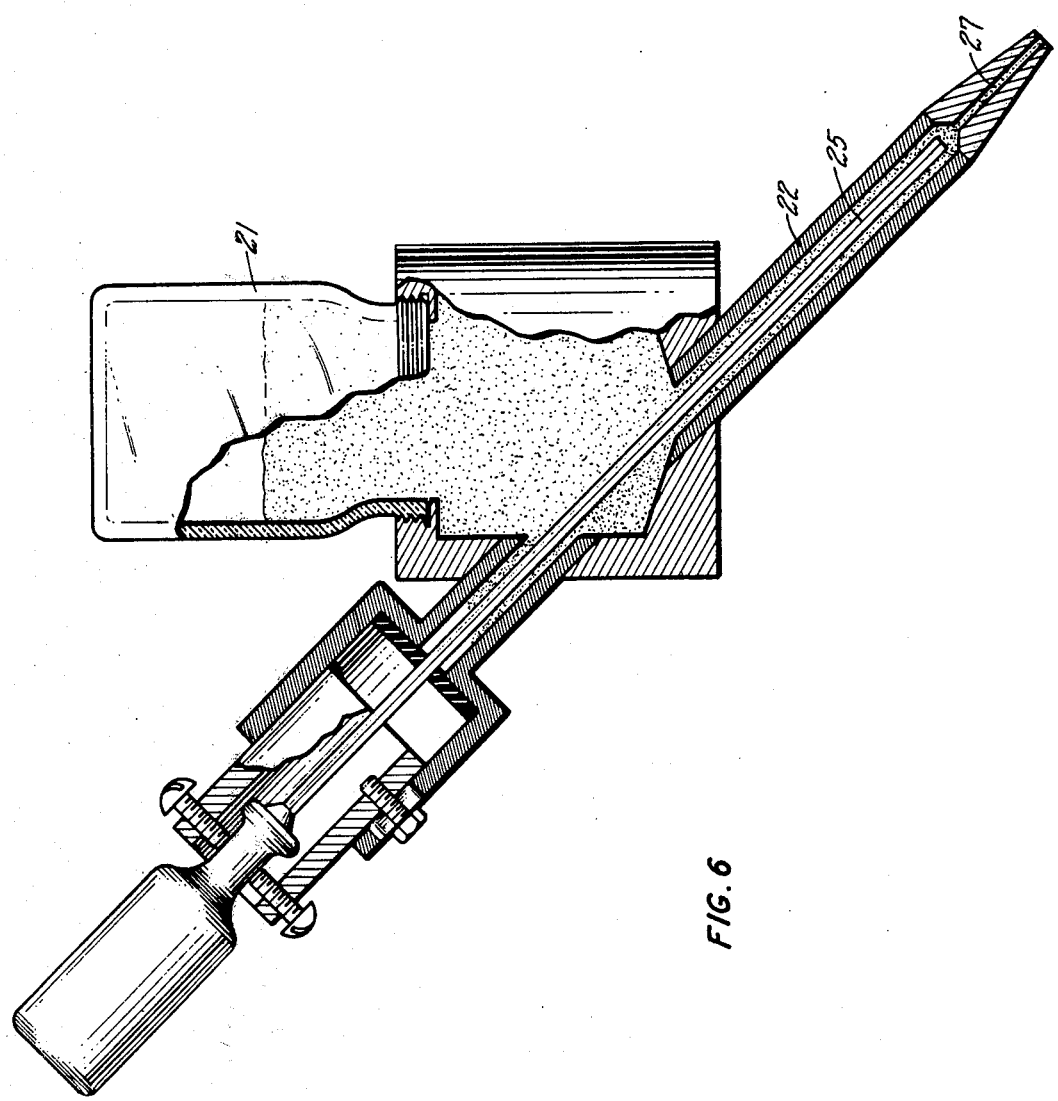

The apparatus used to feed the powder is shown in FIG. 6 and includes a powder feed hopper 21, an elongated powder feed tube 22 terminating in a nozzle 23 aperture having a diameter of about 0.9 mm and containing a vibrating element 25 axially aligned within the powder feed tube. This vibrating element consists of a rod of about 0.1 inch in diameter, and this rod was caused to vibrate at a rate of 120 Hz. This axially aligned vibrating element was found to be important to the successful feeding of the powder material. This vibrating feed assembly is not a part of the present invention, but is described and claimed in a U.S. Pat. No. 4,270,675 filed concurrently with the present application.

The powder feed mechanism was arranged so that the powder struck the surface just outside of the laser beam and then was carried through the laser beam by the movement of the substrate. The sequence was then that the laser beam melted the substrate and that the feedstock material was carried into the laser beam where it also melted and mixed with the melted substrate material.

The point of beam interaction and the powder feed point was translated back and forth across the surface of the workpiece so as to produce a disc of substantial thickness (about 1 inch). When the disc had achieved the diameter of about 4 inches, the feed material was changed to powdered IN 718 which is a commercially available nickel base superalloy having a nominal composition of 18.6% chromium, 3.1% molybdenum, 5% columbium, 9% titanium, 0.4% aluminum, 18.5% iron, balance nickel.

Figure 7:
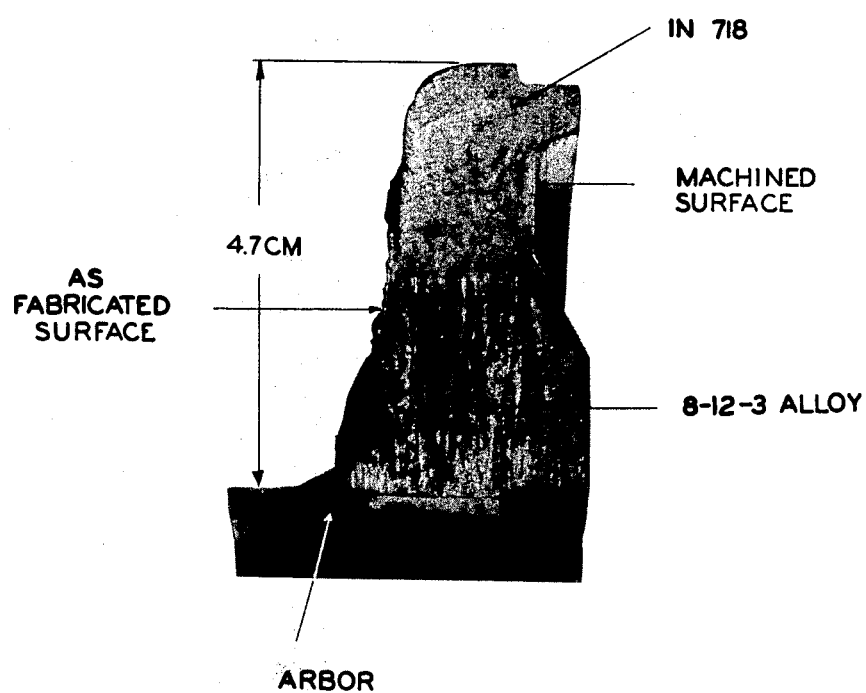
FIG. 7 shows a macrophotograph of a cross section of a disc.

The epitaxial nature of the solidification can be seen in highly oriented microstructure of the disc as shown in FIG. 7. A clear line of delineation can be seen between the nickel-aluminum-molybdenum-tantalum alloy and the IN 718 alloy. Minor cracking was observed in the IN 718 portion, but such cracking was absent in the Ni-Al-Mo-Ta alloy. Cracking is believed to be the result of alloy composition underscoring the importance of the alloy composition in this process.

EXAMPLE 2

A stainless steel mandrel consisting of a 1.8 inch diameter by 2.0 inch long hollow tube was employed and was rotated at 22 rpm. Powder of the same type as that described in Example 1 was fed onto the surface of the rotating mandrel using the apparatus described in Example 1. In this example, the beam and powder feed interaction point were not translated along the mandrel, but were held stationary. This resulted in a build up of a thin fin having a thickness of about 0.025 inches.

A fin of 1 inch in height was produced in a period of about 10 minutes.

EXAMPLE 3

A section of stainless steel tubing 1.5 inches in diameter was used as a mandrel. This mandrel was fixtured and rotated at about 22 rpm so that the surface speed of the mandrel was about 254 cm/min. A wire of type 304 stainless steel having a diameter of 0.9 mm was provided and was fed into the interaction zone.

The relationship between the wire and the laser beam was fixed with respect to each other and both were traversed axially back and forth along the mandrel. The distance of traverse was about 1 inch so that the disc produced had a thickness of about 1 inch. This process was continued for about 1 hour with suitable adjustments being made in the position of the interaction zone as the diameter of the disc increased. The speed of rotation was controlled to maintain a surface speed of about 100 in/min.

EXAMPLE 4

In this example, a 6 inch diameter stainless steel mandrel was provided and was rotated at about 5.3 rpm to produce a surface speed of about 100 in/min.

Wire of the type described in Example 3 was fed into the laser beam. No translation of the beam and wire feed was provided. The relationship between the fin, the laser beam, and the wire was controlled to be essentially that shown in FIG. 3. In this arrangement, the wire lies at the side of the fin, somewhat below the outer periphery of the fin, and surface tension effects draw the melted wire material up to the outer fin periphery and this material is uniformly spread out on this surface. In a period of about 15 minutes, a fin 1 inch in height and about 0.030 in thickness was produced.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. A method for producing metallic articles including the steps of:
    a. providing a starting substrate;
    b. providing a focused energy beam having sufficient energy to melt the substrate and directing this beam so that it strikes the substrate, thereby establishing an interaction zone;
    c. providing relative motion between the energy beam and the substrate so as to control the interaction between the energy beam and the substrate so that surface melting of the substrate occurs without significant surface vaporization;

d. introducing feedstock into the interaction zone in such a fashion that it combines with the surface melted region on the substrate and melts completely, with the volume of feedstock added being less than the volume of melted substrate material and with the melted zone solidifying rapidly after it leaves the interaction zone; and e. repeating steps (a) through (d) (with the substrate being the original substrate plus the added solidified feedstock material) to build up the desired article whereby each portion of the applied feedstock is melted more than once during the process.

2. A method as in claim 1 wherein the substrate has radial symmetry about an axis and the relative motion between the energy beam and the substrate is provided by rotation of the substrate about said axis, and movement of the point of interaction between the energy beam and the feedstock is provided in a radial direction with respect to the axis of rotation as the radial dimension of the article increases.

3. A method as in claim 2 wherein the interaction point is varied parallel to the axis of rotation so as to produce a disc-shaped article of substantial thickness.

4. A method as in claim 2 wherein the interaction point is fixed with respect to the axis of symmetry so that a thin fin is produced.

5. A method as in claims 1, 2 or 3 wherein the feedstock material is provided in the form of a wire which is fed at a uniform rate into the interaction zone.

6. A method as in claims 1, 2 or 4 wherein the feedstock material is provided in the form of a powder which is fed at a uniform rate into the interaction zone.

7. A method as in claim 6 wherein the powder composition is varied during the production of the article.

8. A method of producing a thin fin knife-edge gas path seal including the steps of:

a. providing a starting substrate of radial symmetry;

b. providing a focused energy beam of sufficient intensity to melt the substrate and directing this beam so that it strikes the substrate, thereby establishing an interaction zone;

c. providing relative motion between the energy beam and the substrate, said relative motion being about the substrate axis of radial symmetry, at a rate that controls the interaction between the energy beam and this substrate so that surface melting occurs without significant surface vaporization;

d. introducing feedstock into the interaction, between the substrate and the energy beam, zone so that it combines with the melted substrate portion and melts, with the volume of added feedstock being less than the volume of melted substrate material; and e. maintaining the interaction zone laterally fixed with respect to axis of symmetry, but adjusting the point of interaction between the energy beam and the feedstock in the radial direction to compensate for increasing fin diameter.

9. A method for producing a disc shaped article including the steps of:

a. providing a starting substrate of radial symmetry;

b. providing a focused energy beam of sufficient intensity to melt the substrate and directing this beam so that it strikes the substrate, thereby establishing an interaction zone;

c. providing relative motion between the energy beam and the substrate, said relative motion being about the substrate axis if radial symmetry at a rate that controls the interaction between the energy beam and this substrate so that surface melting occurs without significant surface vaporization;

d. introducing feedstock into the interaction zone so that it combines with the melted substrate portion and melts, with the volume of added feedstock being less than the volume of melted substrate material; and e. traversing the point of interaction between the energy beam and the feedstock laterally with respect to the axis of rotation and adjusting the point of interaction radially to compensate for increasing disc diameter.

10. A method as in claims 1, 8 or 9 in which the melted zone solidifies expitaxially from the underlying substrate.

11. A method as in claims 1, 8 or 9 in which the thickness of the applied feedstock layer is not greater than about 0.005 inch.

* * * * *